(12) United States Patent
Hemsath

(10) Patent No.: US 7,207,323 B1
(45) Date of Patent: Apr. 24, 2007

(54) CATALYTIC CORE REACTOR FOR THERMOCHEMICAL HEAT RECOVERY

(75) Inventor: Klaus Heinrich Hemsath, Palmetto, FL (US)

(73) Assignee: Utilization Technology Development, NFP, Des Plaines, IL (US)

( * ) Notice: Subject to any disclaimer, the term of this patent is extended or adjusted under 35 U.S.C. 154(b) by 0 days.

(21) Appl. No.: 11/327,094

(22) Filed: Jan. 6, 2006

(51) Int. Cl.
*F02B 51/02* (2006.01)

(52) U.S. Cl. ............... 123/568.11; 123/543; 60/278; 60/300

(58) Field of Classification Search ......... 123/536, 123/568.11, 568.15, 543, 545–547, 533, 142.5 R, 123/3; 60/278–279, 300, 302–303
See application file for complete search history.

(56) References Cited

U.S. PATENT DOCUMENTS

| | | | | |
|---|---|---|---|---|
| 3,855,980 | A | * 12/1974 | Weisz et al. ............... 123/3 |
| 3,954,417 | A | * 5/1976 | Jalbing ..................... 422/176 |
| 4,424,771 | A | * 1/1984 | Lovercheck .................. 123/3 |
| 4,862,836 | A | * 9/1989 | Chen et al. ................... 123/3 |
| 6,508,209 | B1 | 1/2003 | Collier, Jr. |
| 6,855,272 | B2 | 2/2005 | Burlingame et al. |
| 7,062,915 | B2 | * 6/2006 | Clawson .................... 60/670 |

* cited by examiner

*Primary Examiner*—Stephen K. Cronin
*Assistant Examiner*—Ka Chun Leung
(74) *Attorney, Agent, or Firm*—Mark E. Fejer

(57) ABSTRACT

A fuel conversion system having an exhaust gas generator, such as an engine or a furnace, having a heated exhaust gas outlet, a reactor vessel having a heated exhaust gas inlet in fluid communication with the heated exhaust gas outlet, having a cooled exhaust gas outlet, and containing at least one reactor tube having an exhaust gas inlet in fluid communication with the heated exhaust gas outlet, a convertible fuel inlet, and a converted fuel outlet, and a monolithic fuel conversion catalyst structure substantially centered within the at least one reactor tube and shaped to form at least one flow channel between the monolithic fuel conversion catalyst structure and an inside wall of the at least one reactor tube.

31 Claims, 5 Drawing Sheets

CATALYTIC CORE REACTOR FOR THERMOCHEMICAL HEAT RECOVERY

BACKGROUND OF THE INVENTION

1. Field of the Invention

This invention relates to thermochemical conversion of hydrocarbon and other organic fuels to produce hydrogen and carbon monoxide. More particularly, this invention relates to method and apparatus for thermochemically converting hydrocarbon and other organic fuels to produce hydrogen and carbon monoxide in which hot exhaust gases from internal combustion engines, furnace exhaust gases and the like are utilized as heating media or reactants in the conversion process. As used herein, the terms "thermochemical conversion" and "thermochemically converting" refer to processes in which the hydrocarbon and/or other organic fuels are reformed or thermally decomposed. This invention also relates to an apparatus for thermochemically converting hydrocarbon and other organic fuels which may be suitable for vehicular installation and use. This invention further relates to a catalytic reactor for thermochemically converting hydrocarbon fuels that performs well at intermediate and low temperatures, in the range of about 500° F. to about 1500° F. This invention further relates to a method of operating an internal combustion engine using a thermochemically converted fuel. In the thermochemical conversion processes of this invention, the thermal efficiency of the combustion process is increased, resulting in lower fuel consumption and related increase in thermal process efficiencies.

2. Description of Related Art

Thermal processes often reject large amounts of heat. The percentage of rejected or waste heat is particularly large in processes in which chemical energy or fuel value is converted into mechanical energy. Exemplary of such processes are engines. Reciprocating internal combustion engines have thermal efficiencies in the range of about 25% to 40% depending upon design and age of the engine. Diesel engines typically have higher efficiencies than gasoline engines. A typical, modern diesel engine may have a mechanical efficiency of about 35%. Thus, depending upon the type of engine employed, up to about 75% of the fuel value consumed by these engines is converted into waste heat. Since the invention of these engines, efforts have been ongoing to increase their mechanical efficiency; and as fuel costs increase, these efforts become more urgent.

One particular approach for utilizing part of the waste heat generated by reciprocating internal combustion engines is thermochemical recuperation or TCR. In this process, a portion of the waste heat is recirculated into the engine. There are at least two approaches to recirculating waste heat into the engine, both of which involve thermochemical fuel reforming.

In the first of these processes, referred to as thermochemical recuperative reforming, a hydrocarbon fuel is mixed with a large amount of steam, resulting in a molar ratio of steam to fuel in the range of about 2 to 3. Using the waste heat recovered from the hot engine exhaust gases, the steam/fuel mixture is catalytically converted into a gas mixture that contains large amounts of hydrogen and carbon monoxide, which may be returned through the fuel intake back to the engine. The reforming reaction can follow different paths based on process conditions and will, accordingly, produce a variety of reaction end products. The basis for thermochemical heat recovery is the application of low temperature, endothermic fuel conversion. When reforming a fuel, thereby producing large percentages of hydrogen and carbon monoxide, the reaction is endothermic; that is, the reaction consumes heat. As a result, sensible heat is consumed in the reforming reaction. The consumed, sensible heat provided by cooling of hot exhaust gases is used for converting fuel into products with different chemical compositions and a higher fuel heating value. Thus, comparatively low-value waste heat is converted into a higher heating value fuel.

In the second of these processes, referred to as exhaust gas reforming (EGR), exhaust gas recirculation, or more descriptively as catalytic exhaust reforming, the water vapor in the engine exhaust gases is used as reactant for the reforming reaction. In yet another application, other organic fuels such as methanol and ethanol are thermally decomposed in a homogeneous or catalytic reaction, preferably in the presence of water vapor.

Common to all these conversion processes is an increase in heating value of the employed fuel. Thermodynamic considerations immediately show that the increase in heating value can be substantial. For steam reforming of methane, a maximum increase of 25.7% can be predicted. Realistically, only a fraction of this potentially available energy can be converted. For the previously mentioned decomposition reactions of methanol and ethanol, the values are much lower and amount to 13.4% and 20.0% respectively. If one conservatively assumes a 30% efficiency for these three fuel conversion processes, one can predict an increase of engine efficiencies for the three different fuels mentioned of 7.5% for steam reforming of methane, and 4% or 6.0% for catalytic and thermal conversion of methanol and ethanol. These figures are not large but are respectable when compared with historic annual engine efficiency improvements.

U.S. Pat. No. 6,508,209 B1 to Collier, Jr. teaches the introduction of natural gas and/or propane into a reforming reactor for the purpose of converting or reforming a portion thereof to hydrogen and carbon monoxide, providing a gaseous mixture exiting the reactor comprising methane and/or propane, hydrogen, steam, nitrogen, carbon monoxide, and carbon dioxide. The gaseous mixture is mixed with air to provide a gaseous fuel mixture and air combination which is introduced into the internal combustion engine and combusted to produce an exhaust gas. A portion of the exhaust gas is recycled and introduced into the reforming reactor for the purpose of reforming a portion of the gaseous fuel to hydrogen and carbon monoxide. In accordance with one embodiment, the exhaust gas is used, without diluting the combustion charge, for preheating the fuel to be reformed as well as the catalyst bed, for purposes of reforming the fuel.

U.S. Pat. No. 6,855,272 B2 to Burlingame et al. teaches a syngas production process and reforming exchanger in which a first portion of hydrocarbon feed mixed with steam and oxidant is passed through an auto-thermal catalytic steam reforming zone to form a first reformed gas of reduced hydrocarbon content, a second portion of the hydrocarbon feed mixed with steam is passed through an endothermic catalytic steam reforming zone to form a second reformed gas of reduced hydrocarbon content, and the first and second portions of reformed gases are mixed, forming a gas mixture which is passed through a heat exchange zone for cooling the gas mixture, thereby, providing heat to the endothermic catalytic steam reforming zone. The endothermic catalytic steam reforming zone and the heat exchange zone are respectively disposed tube side and shell side within a shell-and-tube reforming exchanger, which comprises a plurality of tubes packed with low pressure drop catalyst-bearing monolithic structures.

Over the past several years, fuel cells, which typically use hydrogen ($H_2$) as a fuel, have been receiving a substantial amount of attention due to their almost emission-free operation. The primary exhaust from a fuel cell using hydrogen, as with other systems in which hydrogen is used as a fuel, is water. It will, thus, be apparent that, in addition to efficiency benefits, substantial environmental benefits may be realized from the use of hydrogen as a fuel in other applications as well, such as internal combustion engines, including reciprocating internal combustion engines and gas turbines. In particular, the hydrogen in the fuel extends the lean operating range of an engine and increases the burning velocity, thereby increasing the combustion rate. Thus, the use of hydrogen in internal combustion engines improves the combustion process and results in increased engine efficiencies. This benefit is largely independent of the heating value increase. Therefore, additional performance enhancements can be expected. The combined effects of thermochemical fuel conversion and combustion process improvements will reduce specific fuel consumption, will lower greenhouse gas emissions, and will open the door to increased utilization of biologically derived fuels.

Notwithstanding the apparent attractiveness of using thermochemical fuel conversion for increasing the efficiency of engines and reducing emissions output, the proposed energy recovery and improved thermal efficiency methods have not found widespread use due to a number of technical problems. One of the major problems is a lack of thermochemical fuel conversion systems suitable for use in vehicular applications.

SUMMARY OF THE INVENTION

Accordingly, it is one object of this invention to provide a method and apparatus for thermochemical fuel conversion suitable for use in vehicular applications.

It is another object of this invention to provide a method and apparatus for thermochemical fuel conversion using the exhaust gases from engines as a thermochemical fuel conversion reactant.

It is another object of this invention to provide a method and apparatus for thermochemical fuel conversion using the exhaust gases from combustion processes as a thermochemical fuel conversion reactant.

It is another object of this invention to provide a method for thermally decomposing organic fuels into mixtures of hydrogen and carbon monoxide and using for that purpose waste heat, rejected by the engine, to increase the heating value of the fuel, thereby increasing engine efficiency, reducing operating costs, and diminishing greenhouse emissions.

These and other objects of this invention are addressed by a fuel conversion system comprising exhaust gas generation means for generating heated exhaust gas, which exhaust gas generation means comprises a heated exhaust gas outlet, fuel conversion means for converting a convertible fuel, which fuel conversion means comprises a heated exhaust gas inlet in fluid communication with the heated exhaust gas outlet of the exhaust gas generation means and which comprises a convertible fuel inlet in fluid communication with a convertible fuel source, wherein the heated exhaust gas inlet and the convertible fuel inlet are arranged to provide mixing of an exhaust gas and the convertible fuel in the fuel conversion means, and at least one fuel conversion catalyst disposed within the fuel conversion means. The fuel conversion means comprises a reactor vessel comprising at least one reactor tube, which at least one reactor tube has an exhaust gas inlet in fluid communication with the heated exhaust gas outlet of the exhaust gas generation means, a convertible fuel inlet, and a converted fuel outlet. A monolithic fuel conversion catalyst structure is substantially centered within the at least one reactor tube and is shaped to form at least one flow channel between the monolithic fuel conversion catalyst structure and an inside wall of the at least one reactor tube.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed herein is a fuel conversion reactor concept that is adapted to the specific requirements of a thermochemical fuel conversion process with special considerations for on-board vehicle installations. In addition to vehicular applications, the reactor concept can also be used for a wide range of other catalytic processes. This process is characterized by low reaction temperatures, typically in the range of about 500° F. to about 1500° F., and can take place at high pressures as is customary in reforming processes or at low pressures such as in thermal decomposition reactions. In fuel reforming, a catalyst is employed to facilitate the reversible reaction of methane with steam to form hydrogen and carbon monoxide. The reactor is particularly well suited for conditions where one reactant operates at a significantly lower pressure than the other reactant. With the heat transfer and catalyst configurations of the reactor of this invention, several advantages are realized. In particular, internal heat transfer is very high, heat transfer to the catalyst occurs rapidly, and mass internal concentrations differentials are kept at very low levels. The catalyst forms at least a portion of a monolithic catalyst structure and, thus, is easily replaceable in the event of poisoning or deactivation.

In contrast to thermochemical fuel reforming reactors for steam reforming, which takes place at high temperatures with a high steam-to-fuel ratio, the thermochemical fuel conversion reactor of this invention is usable equally well for exhaust gas conversion, in which the exhaust gases from an engine, combustor or other suitable exhaust gas generation means are employed as a reactant. Thus, instead of steam, the water vapor contained in the exhaust gases is used for the reforming reaction. The reactor is also suited for the homogeneous or catalytic thermal decomposition of other organic or petroleum based fuels.

Figure 1:
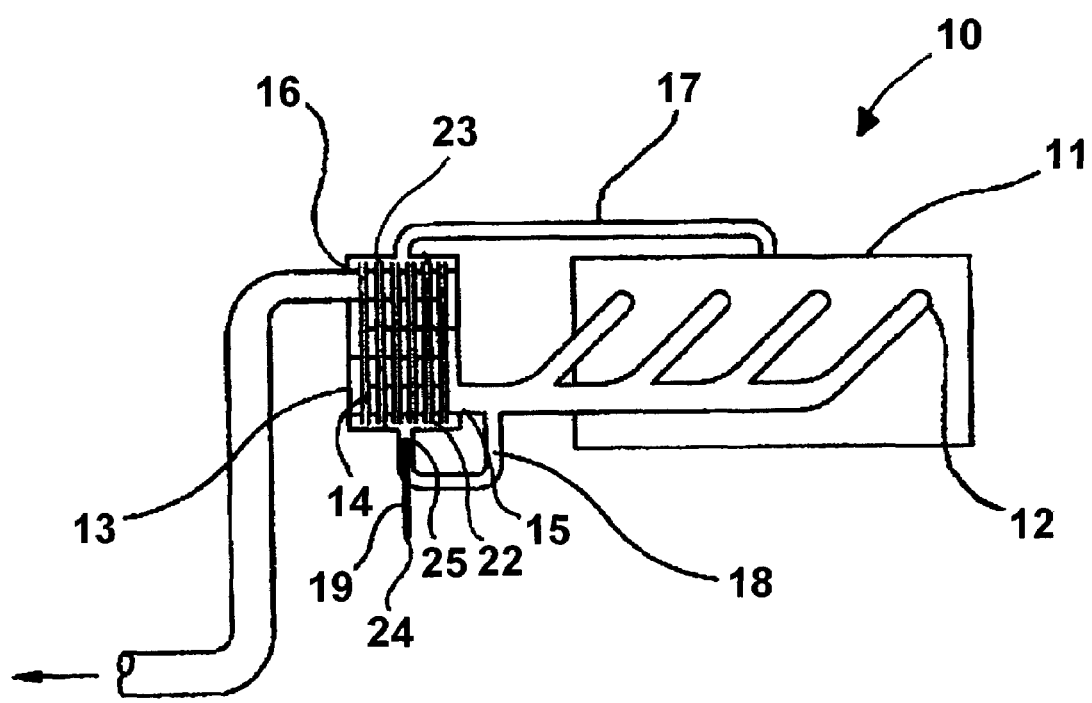
FIG. 1 is a schematic diagram of a thermochemical fuel conversion system in accordance with one embodiment of this invention.
Figure 2:
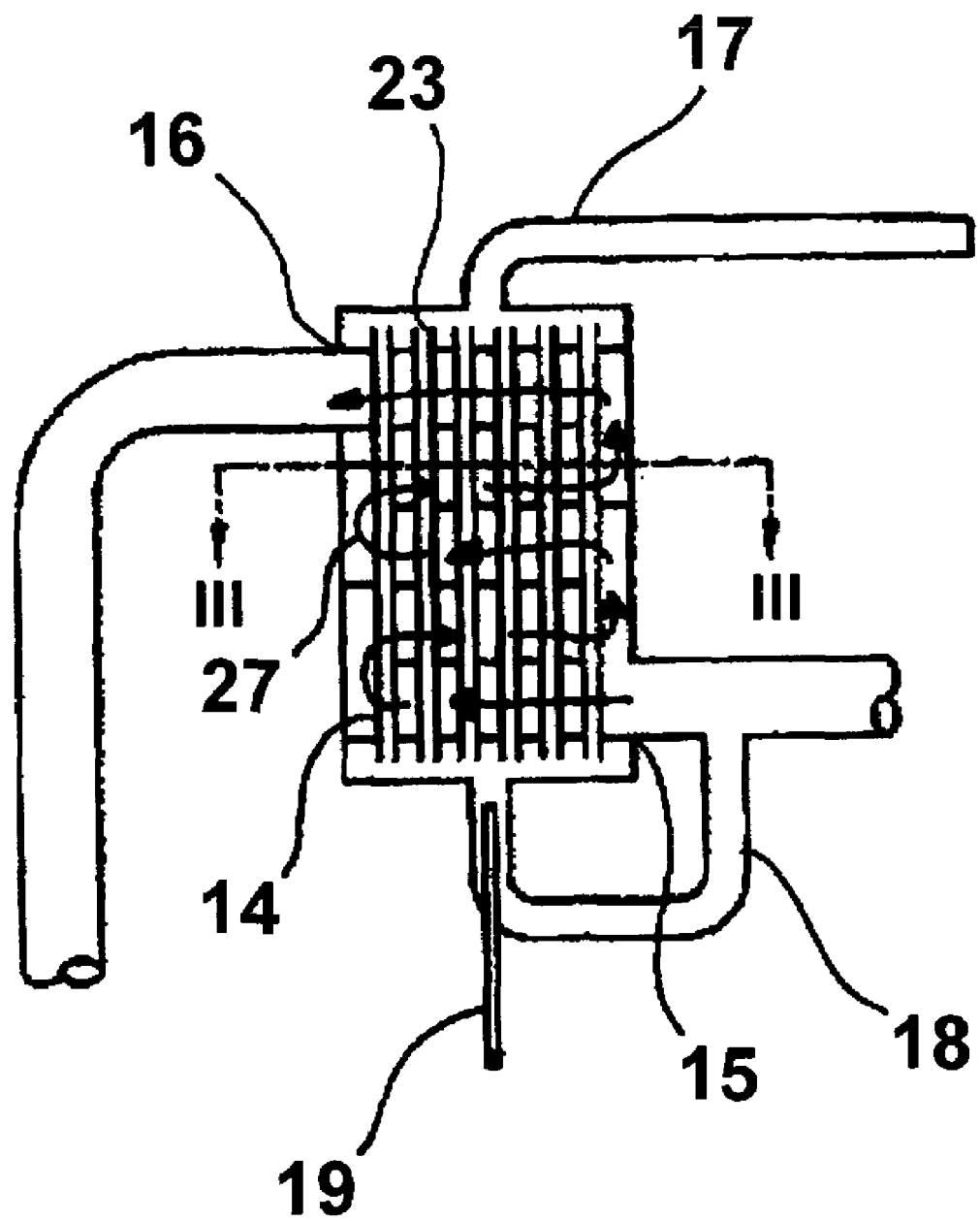
FIG. 2 is a schematic diagram of an exemplary reactor vessel in accordance with one embodiment of this invention.
Figure 3:
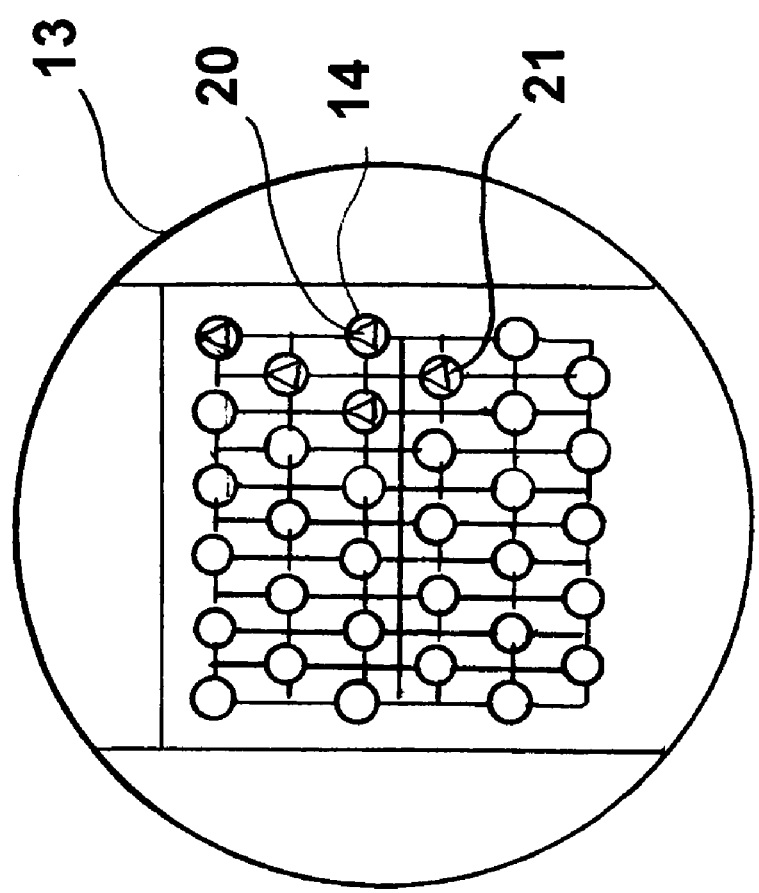
FIG. 3 is a view of an exemplary reactor vessel in accordance with one embodiment of this invention as shown in FIG. 2 taken along the line III—III.

The fuel conversion reactor of this invention comprises reactor vessel 13 containing reactor tubes 14 having an outer heat transfer surface, an inner heat transfer surface, and a central carrier for a catalytically active substance which, in addition to being suited for applications at intermediate and lower heating medium and reactant temperatures, may be employed in high temperature steam reforming. As shown in FIGS. 1–3, the fuel conversion system 10 of this invention comprises exhaust gas generation means 11 for generating exhaust gases having at least one heated exhaust gas outlet 12, reactor vessel 13 containing a plurality of reactor tubes 14 and having a primary exhaust gas inlet 15 in fluid communication with the heated exhausted gas outlet 12 of exhaust gas generation means 11 and having a cooled primary exhaust gas outlet 16, said plurality of reactor tubes having a fuel/secondary exhaust gas inlet 22 and a converted fuel outlet 23, a monolithic fuel conversion catalyst structure 20 disposed within at least a portion of the plurality of reactor tubes 14, a secondary exhaust gas bypass 18 providing fluid communication between heated exhaust gas outlet 12 and fuel/secondary exhaust gas inlet 22, and a fuel supply conduit 19 having a fuel inlet 24 in fluid communication with a fuel source (not shown) and having a fuel outlet 25 in fluid communication with fuel/secondary exhaust gas inlet 22. The fuel conversion system in accordance with one embodiment of this invention comprises converted fuel means 17 for returning at least a portion of the converted fuel generated in reactor tubes 14 back to exhaust gas generation means 11.

In operation, the heated exhaust gases generated by exhaust gas generation means 11 are split into primary (larger) and secondary (smaller) exhaust gas streams, the primary exhaust gas stream entering reactor vessel 13 through primary exhaust gas inlet 15 at one end of the reactor vessel and leaving reactor vessel 13 through cooled primary exhaust gas outlet 16 at the other end of the reactor vessel after transferring heat to the outside of the reactor tubes 14, whereby the primary exhaust gas stream is cooled in the process. The secondary exhaust gas stream is diverted through secondary exhaust gas bypass 18 where the exhaust gases comprising the secondary exhaust gas stream are mixed with fuel gases exiting fuel supply conduit 19 through fuel outlet 25 prior to contacting a monolithic fuel conversion catalyst structure 20 disposed within at least a portion of the plurality of reactor tubes 14. After subjecting the mixture of secondary exhaust gases and fuel to thermal and catalytic conversion reactions within reactor tubes, forming converted gases, the converted gases are returned to the exhaust gas generation means 11 by way of intake duct 17. The primary exhaust gas stream, having entered reactor vessel 13, shown in FIG. 2, in concurrent flow at the bottom and having exited it at the top, are cooled and discharged to the atmosphere through cooled primary exhaust gas outlet 16. Superimposed upon the concurrent flow is a direction changing flow pattern represented by arrows 27 that creates the highest local convective heat fluxes on the outside of reactor tubes 14.

The monolithic fuel conversion catalyst structure employed in this invention comprises a fuel conversion catalyst and a monolithic substrate material. In accordance with one embodiment of this invention, the monolithic substrate material is a porous substrate material with the fuel reforming catalyst either deposited on the surface of or dispersed within the monolithic, porous catalyst substrate material. In accordance with another embodiment of this invention, the monolithic substrate material is a dense, non-porous material with the fuel reforming catalyst deposited on the outer surface thereof. The surface may be smooth or may be provided with dimples and/or shallow fins.

Any fuel conversion catalyst known to those skilled in the art may be employed in the fuel conversion system of this invention. Typically, such catalysts comprise metals and/or metal oxides. Exemplary of such catalysts are oxides of nickel, copper, zinc, chromium and other noble metals.

The catalyst substrate employed in the monolithic fuel conversion catalyst structure can be fabricated from a wide range of materials, both metallic and ceramic. Exemplary of such metallic materials are heat resistant steels, nickel, and other heat resistant alloys. Exemplary of such ceramic materials are alumina, silicon carbide, silicates, alumosilicates in the form of natural minerals or in purer modifications such as mullites and zeolites. Other proprietary substrates can also be used if proven to be effective for the contemplated reactions.

The dimensional characteristics of the reactor tubes employed in the fuel conversion reactor of this invention will vary depending upon the process conditions. The cylindrical shape of the reactor tubes generally enables high process temperatures and high process pressures. At high process temperatures, above about 1800° F. depending upon the material employed for construction of the reactor tubes, the mechanical design of the reactor tubes must take into consideration the possibility of plastic deformation of the tubes whenever high stresses are applied. The smaller the tube diameter, the thinner the reactor tube wall can be, allowing increased heat fluxes without a loss of tube wall strength. The stresses applied to the tube are dependent on the internal pressure and on the ratio of tube diameter to tube thickness. Thus, smaller tubes can contain higher pressures when using smaller wall thicknesses.

It will be apparent to those skilled in the art that there are at least two important components to any endothermic reactor which contribute to the performance of the reactor. A large surface area must be available for heat transfer and high heat fluxes (heat flow per unit area) must be provided by proper design measures. Critical heat flux locations for the fuel conversion reactor of this invention include the outside of the reactor tubes, the inside of the reactor tubes, the reactor tube wall thickness, and the surface of the acting catalyst. High gas velocities in a small annulus provide high heat transfer coefficients on both sides of the annulus. Thus, a small tube having the smallest possible hydraulic diameter with a catalytic insert will generate exceptionally high heat transfer rates on the inside of the reactor tube. Those skilled in the art understand that high convective heat transfer rates will also translate into exceptionally high mass transfer rates. The result is a reactor design that produces virtually uniform mass concentrations (±5 molar percent) in the radial direction across reactor tubes 14, that is able to maintain substantially uniform temperatures (±10° F.) within the reactor tubes, and that provides substantially uniform residence times (±10%) for the atoms comprising the reactants and converted fuel within the reactor tubes. This is in stark contrast to typical steam reforming reactors and most research tube reactors in which the cross-section is filled with catalyst in the form of pellets or lumps. Typically, in packed beds of catalysts, very steep radial mass concentration profiles can be observed in cross-sections of the reactor tubes. To provide the desired performance, the monolithic fuel conversion catalyst structure 20 must be shaped such that it is centered within the reactor tube 14 and such that it forms flow channels 21 with small radial dimensions as shown in FIG. 3. This catalyst arrangement and the use of monolithic, dense, and non-porous catalyst structures in accordance with one embodiment of this invention is thought to reduce deposits of carbon in reforming and thermal conversion reactions. Such coke or soot formation can often be observed when hydrocarbons and other organic compounds are subjected to endothermic reactions. Elimination of deposits or lowering of deposition rates on catalyst surfaces will prevent or delay the decrease in yields of reactants and will lengthen the time intervals between catalyst replacements.

In operation, a local equilibrium temperature between the reactor tube wall and the monolithic fuel conversion catalyst structure surface will develop under steady state flow conditions. The strong endothermic effect of the fuel conversion reaction will cool down the reacting gas and will contribute to the internal heat transfer by generating a larger temperature differential. This differential will be very stable. The higher the reactivity of the fuel conversion catalyst, the larger the temperature differential will be.

Figure 6:
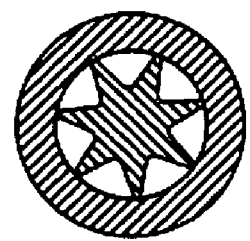
FIG. 6 is a radial cross-sectional view of a reactor tube and monolithic fuel conversion catalyst structure in accordance with one embodiment of this invention.
Figure 5:
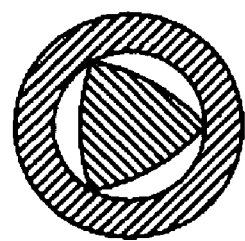
FIG. 5 is a radial cross-sectional view of a reactor tube and monolithic fuel conversion catalyst structure in accordance with one embodiment of this invention.
Figure 4:
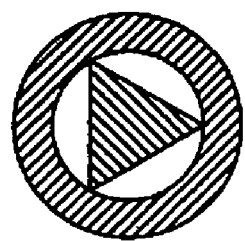
FIG. 4 is a radial cross-sectional view of a reactor tube and monolithic fuel conversion catalyst structure in accordance with one embodiment of this invention.

A wide variety of monolithic fuel conversion catalyst structure shapes may be employed in the fuel conversion reactor of this invention. In accordance with one preferred embodiment of this invention, the radial cross-section of the monolithic fuel conversion catalyst structure has a polygonal shape. In accordance with one particularly preferred embodiment, the monolithic fuel conversion catalyst structure 20 has a triangular shape as shown in FIG. 4. The sides of the triangular shapes may be flat, as shown in FIG. 4, or curved, as shown in FIG. 5. In accordance with one embodiment of this invention, the radial cross-section of the monolithic fuel conversion catalyst structure, as shown in FIG. 6, comprises a plurality of longitudinal fins arranged in a star-shaped pattern.

Catalyst sections that have intermediate length-to-diameter ratios will accommodate differential thermal expansion and can be easily removed and replaced. Length-to-diameter ratios (characteristic radial dimension) are preferably in the range of about 10 to 20. Substrate shapes can be easily produced by extrusion and can be coated with catalyst by all established catalyst manufacturing techniques.

In FIGS. 1 and 2, exhaust gas flow and reactant flow are concurrent. Equally applicable is a counter current configuration. Due to the endothermic nature of the reactions and due to a variety of other considerations with respect to arrangements of ducts, local catalytic activity distributions, and particular specific reaction characteristics all major heat exchanger flow configurations must be analyzed before selecting the most suited one.

In accordance with one preferred embodiment of this invention, the exhaust gas generation means comprises an internal combustion engine. By way of example, a fuel reforming reactor for a 1 MW engine might have the following configuration. In particular, four reactor tube bundles, each bundle being 36 inches long and containing 250 reactor tubes in two opposing tube sheets, with an outside reactor tube diameter of about 0.5 inches and the assembly fitting into a 42 inch square would be needed to produce a desired amount of hydrogen. With allowances for inlet, outlet, and flow equalizing sections, one would end up with a packaged heat exchanger of less than 8 feet long, 8 feet high, and 5 feet wide. This exchanger would enable easy catalyst change out and would be readily designed for very high process temperatures and pressures.

In operation, a hydrocarbon fuel, such as natural gas, methanol or ethanol, is either mixed with the exhaust gases from an engine, combustor or other exhaust gas generating means, mixed with steam, or introduced directly into the reactor tubes of the conversion reactor vessel in which a monolithic fuel conversion catalyst structure is disposed. Temperatures in the reactor tubes are preferably in the range of about 500° F. to about 1500° F. Water vapor within the exhaust gases can be used and may become part of other catalyzed reaction pathways as a reactant when converting fuel for use in a combustion engine. In accordance with one embodiment of this invention in which the exhaust gases are generated in an engine, the reformed fuel is recirculated to the fuel input of the engine.

Figure 7:
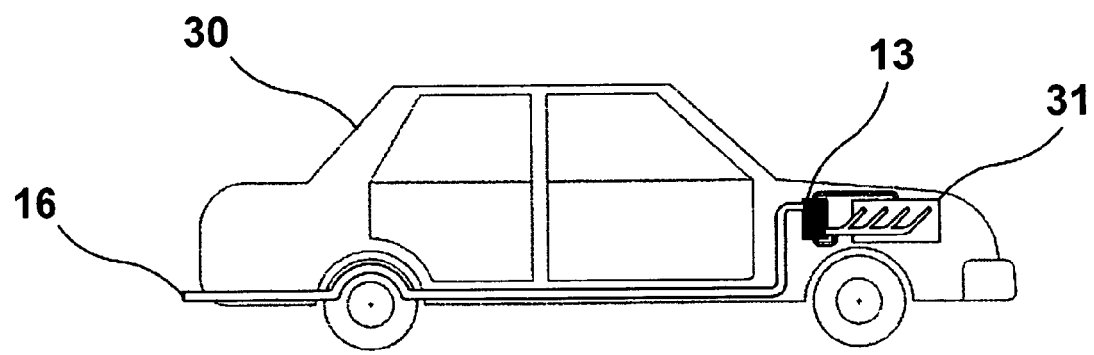
FIG. 7 is a diagram showing an automotive vehicle comprising a thermochemical fuel conversion system in accordance with one embodiment of this invention.

FIG. 7 shows an exemplary automotive vehicle 30 having an internal combustion engine 31 having an exhaust gas outlet 16, a reactor vessel 13 comprising a plurality of reactor tubes in fluid communication with the exhaust gas inlet. As shown in FIGS. 1 and 2, line 17 is provided for recirculation of at least a portion of the reformed fuel to the fuel intake of engine 31.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. A fuel conversion system comprising:
   exhaust gas generation means for generating exhaust gases having a heated exhaust gas outlet;
   a reactor vessel having a heated exhaust gas inlet in fluid communication with said heated exhaust gas outlet, having a cooled exhaust gas outlet, and containing at least one reactor tube, said at least one reactor tube having an exhaust gas inlet in fluid communication with said heated exhaust gas outlet, a convertible fuel inlet, and a converted fuel outlet; and
   a monolithic fuel conversion catalyst structure substantially centered within said at least one reactor tube and shaped to form at least one flow channel between said monolithic fuel conversion catalyst structure and an inside wall of said at least one reactor tube.

2. A fuel conversion system in accordance with claim 1, wherein said monolithic fuel conversion catalyst structure comprises at least one fuel conversion catalyst and a monolithic substrate material.

3. A fuel conversion system in accordance with claim 2, wherein said monolithic substrate material is a porous substrate material with said fuel conversion catalyst at least one of disposed on an outer surface of said porous substrate material and dispersed within said porous substrate material.

4. A fuel conversion system in accordance with claim 2, wherein said monolithic substrate material is a dense, non-porous material with said fuel conversion catalyst disposed on an outer surface of said monolithic substrate material.

5. A fuel conversion system in accordance with claim 1, wherein said exhaust gas generation means comprises an internal combustion engine.

6. A fuel conversion system in accordance with claim 1, wherein a radial cross-section of said monolithic fuel conversion catalyst structure has a polygonal shape.

7. A fuel conversion system in accordance with claim 6, wherein said radial cross-section has a generally triangular shape.

8. A fuel conversion system in accordance with claim 7, wherein each side of said triangular shape is curved.

9. A fuel conversion system in accordance with claim 6, wherein said radial cross-section comprises a plurality of longitudinal fins arranged in a star-shaped pattern.

10. An apparatus comprising:
an engine having an exhaust gas outlet;
a reactor vessel having a heated exhaust gas inlet in fluid communication with said exhaust gas outlet, having a cooled exhaust gas outlet, and containing at least one bundle of reactor tubes having an exhaust gas inlet in fluid communication with said exhaust gas outlet and having a converted fuel outlet; and
a monolithic fuel conversion catalyst structure disposed within at least a portion of said reactor tubes.

11. An apparatus in accordance with claim 10, wherein said engine is an internal combustion engine.

12. An apparatus in accordance with claim 10, wherein a radial cross-section of said monolithic fuel conversion catalyst structure has a polygonal shape.

13. An apparatus in accordance with claim 12, wherein said monolithic fuel conversion catalyst structure has a triangular shaped radial cross-section.

14. An apparatus in accordance with claim 13, wherein each side of said triangular shape is curved.

15. An apparatus in accordance with claim 10, wherein said monolithic fuel conversion catalyst structure comprises at least one fuel conversion catalyst and a monolithic substrate material.

16. An apparatus in accordance with claim 15, wherein said monolithic substrate material is a porous substrate material with said fuel conversion catalyst at least one of disposed on an outer surface of said porous substrate material and dispersed within said porous substrate material.

17. An apparatus in accordance with claim 15, wherein said monolithic substrate material is a dense, non-porous material with said fuel conversion catalyst disposed on an outer surface of said monolithic substrate material.

18. An apparatus in accordance with claim 10, wherein said monolithic fuel conversion catalyst structure is substantially centered within said reactor tube and is shaped to form at least one flow channel between said at least one monolithic fuel conversion catalyst structure and an inside wall of said reactor tube.

19. An automotive vehicle comprising:
an internal combustion engine having a fuel input and an exhaust gas outlet;
a reactor vessel having a heated exhaust gas inlet in fluid communication with said exhaust gas outlet, having a cooled exhaust gas outlet, and containing at least one bundle of reactor tubes having an exhaust gas inlet in fluid communication with said exhaust gas outlet and having a converted fuel outlet; and
a monolithic fuel conversion catalyst structure disposed within at least a portion of said reactor tubes.

20. An automotive vehicle in accordance with claim 19, wherein said monolithic fuel conversion catalyst structure is substantially centered within said reactor tubes and is shaped to form at least one flow channel between said at least one monolithic fuel conversion catalyst structure and an inside wall of said reactor tubes.

21. An automotive vehicle in accordance with claim 20, wherein a radial cross-section of said monolithic fuel conversion catalyst structure has a polygonal shape.

22. An automotive vehicle in accordance with claim 21, wherein said monolithic fuel conversion catalyst structure has a triangular shaped radial cross-section.

23. An automotive vehicle in accordance with claim 22, wherein each side of said triangular shape is curved.

24. An automotive vehicle in accordance with claim 19, wherein said monolithic fuel conversion catalyst structure comprises at least one fuel conversion catalyst and a monolithic substrate material.

25. An automotive vehicle in accordance with claim 24, wherein said monolithic substrate material is a porous substrate material with said fuel conversion catalyst at least one of disposed on an outer surface of said porous substrate material and dispersed within said porous substrate material.

26. An automotive vehicle in accordance with claim 24, wherein said monolithic substrate material is a dense, non-porous material with said fuel conversion catalyst disposed on an outer surface of said monolithic substrate material.

27. A method for thermochemically converting hydrocarbon and carbonaceous fuels to produce hydrogen and carbon monoxide, the method comprising the steps of:
generating exhaust gases using one of an engine and a combustor;
transporting a first portion of said exhaust gases to a fuel conversion reactor comprising a reactor vessel containing at least one reactor tube having an exhaust gas inlet, a convertible fuel inlet, and a converted fuel outlet, and a monolithic fuel conversion catalyst structure substantially centered within said at least one reactor tube and shaped to form at least one flow channel between said monolithic fuel conversion catalyst structure and an inside wall of said at least one reactor tube, said first portion of said exhaust gases contacting an outer surface of said at least one reactor tube;
transporting a second portion of said exhaust gases through said exhaust gas inlet into said at least one reactor tube;
introducing at least one of said hydrocarbon and carbonaceous fuel through said convertible fuel inlet into said at least one reactor tube;
converting said at least one of said hydrocarbon and carbonaceous fuel in said at least one reactor tube to a converted fuel comprising hydrogen and carbon monoxide; and
removing said converted fuel from said at least one reactor tube through said converted fuel outlet.

28. A method in accordance with claim 27, wherein at least a portion of said converted fuel is returned to a fuel intake of said one of said engine and said combustor.

29. A method in accordance with claim 27, wherein a temperature within said at least one reactor tube is substantially uniform.

30. A method in accordance with claim 27, wherein a mass concentration in a radial direction within said at least one reactor tube is substantially uniform.

31. A method in accordance with claim 27, wherein atoms comprising said second portion of exhaust gases, said at least one of said hydrocarbon and said carbonaceous fuel, and said converted fuel have a substantially uniform residence time within said at least one reactor tube.

* * * * *